United States Patent
Ševčenko et al.

(10) Patent No.: US 12,430,426 B2
(45) Date of Patent: Sep. 30, 2025

(54) SYSTEM AND METHOD FOR AUTOMATIC BINARY SEGMENTATION

(71) Applicant: UAB 360 IT, Vilnius (LT)

(72) Inventors: Aleksandr Ševčenko, Vilnius (LT); Mantas Briliauskas, Vilnius (LT)

(73) Assignee: UAB 360 IT, Vilnius (LT)

( * ) Notice: Subject to any disclaimer, the term of this patent is extended or adjusted under 35 U.S.C. 154(b) by 303 days.

(21) Appl. No.: 17/977,000

(22) Filed: Oct. 31, 2022

(65) Prior Publication Data

US 2024/0143747 A1    May 2, 2024

(51) Int. Cl.
*G06F 21/55* (2013.01)
*G06N 20/00* (2019.01)

(52) U.S. Cl.
CPC .......... *G06F 21/554* (2013.01); *G06F 21/552* (2013.01); *G06N 20/00* (2019.01)

(58) Field of Classification Search
CPC ...... G06F 21/554; G06F 21/552; G06N 20/00
See application file for complete search history.

(56) References Cited

U.S. PATENT DOCUMENTS

| | | | |
|---|---|---|---|
| 2014/0090061 A1* | 3/2014 | Avasarala | G06F 21/566 726/24 |
| 2020/0257799 A1* | 8/2020 | Saxe | G06F 21/563 |
| 2021/0385232 A1* | 12/2021 | Kutt | H04L 63/0227 |
| 2023/0386621 A1* | 11/2023 | Carlson | G16H 10/40 |
| 2024/0129004 A1* | 4/2024 | Lee | H04B 7/046 |

* cited by examiner

*Primary Examiner* — Han Yang
(74) *Attorney, Agent, or Firm* — Moser Taboada (57) ABSTRACT

Methods, apparatuses and systems for automatic binary file segmentation include receiving binary content, applying a first machine learning process to the binary content to determine data segments in the binary content by identifying at least one of a respective starting point or end point of different data types in the binary content, examining the determined data segments of the binary content to identify data segments that are resistant to analysis, and applying respective techniques to the identified, analysis-resistant data segments to render the content of the identified, analysis-resistant data segments. In some embodiments, the rendering of the content of the identified, analysis-resistant data segments enables the identified, analysis-resistant segments to be analyzed, for example, to determine if the identified, analysis-resistant segments contain malicious content.

20 Claims, 4 Drawing Sheets

SYSTEM AND METHOD FOR AUTOMATIC BINARY SEGMENTATION

FIELD

The present principles relate generally to computer security, and more particularly to identifying security issues in analysis-resistant binary content using binary segmentation.

BACKGROUND

Antimalware (AM) applications employ machine learning (ML) tools in their malware recognition modules. An ML tool has an underlying ML algorithm that needs to be trained with a specific dataset that would allow an AM application to use it for malware recognition.

In other words, an ML algorithm discovers and formalizes the features/principles that underlie the data in the dataset. With this knowledge, the algorithm can "reason" the properties of previously unseen data samples. In malware detection, a previously unseen data sample could be a new file and/or file's property. In some instances, the new file and/or property could include malware or a benign program.

In the current state of the art, ML tools for AM applications are trained either using Unsupervised or Supervised learning approaches. The most common is the Supervised learning approach, where the ML model is trained using a dataset with multiple samples of code. During the supervised learning approach, the model can be trained with a dataset and fitted to the specifics of the dataset. The trained model can be applied to new samples of data and implemented to produce predictions. That is, based on the earlier examples of malware, the ML tool becomes capable of predicting the maliciousness in the new samples of data.

The ML tool, however, depends largely on the provided dataset. In most cases, the dataset contains mostly known executable files with the history of being malicious. In those cases, the ML tool is capable of predicting the maliciousness of the executable files. Unfortunately, some binary content is resistant to analysis and, as such, those files are incapable of being used as data for training a model to recognize the maliciousness of those files. Such files are also unable to be analyzed to determine if they include malware. That limits the AM application's capability to detect malware in binary files that are resistant to analysis.

Therefore, there is a need for improved methods, apparatuses and systems for analysis of analysis-resistant content such as binary content using, for example, binary segmentation.

SUMMARY

Systems and methods for analysis of analysis-resistant content, such as binary content, using binary segmentation are provided herein.

In some embodiments, a method of the present principles includes receiving binary content, applying a first machine learning process to the binary content to determine data segments in the binary content by identifying at least one of a respective starting point or end point of different data types in the binary content, examining the determined data segments of the binary content to identify data segments that are resistant to analysis, and applying respective techniques to the identified, analysis-resistant data segments to render the content of the identified, analysis-resistant data segments.

In some embodiments, the method can further include analyzing the rendered content of the identified, analysis-resistant data segments using a second machine learning process to determine if the identified, analysis-resistant data segments contain malicious content and if the rendered content contains malicious content, training a machine learning process to recognize the rendered content as malicious content.

In some embodiments an apparatus of the present principles includes a memory for storing at least one of programs or instructions and a processor programmed to execute the at least one of programs or instructions to perform a method of the present principles, which in some embodiments includes receiving binary content, applying a first machine learning process to the binary content to determine data segments in the binary content by identifying at least one of a respective starting point or end point of different data types in the binary content, examining the determined data segments of the binary content to identify data segments that are resistant to analysis and applying respective techniques to the identified, analysis-resistant data segments to render the content of the identified, analysis-resistant data segments.

In some embodiments, the method can further include analyzing the rendered content of the identified, analysis-resistant data segments using a second machine learning process to determine if the identified, analysis-resistant data segments contain malicious content and if the rendered content contains malicious content, training a machine learning process to recognize the rendered content as malicious content.

In some embodiments, a non-transitory computer readable storage medium of the present principles has stored thereon a plurality of instructions that when executed by a processor performs a method including receiving binary content, applying a first machine learning process to the binary content to determine data segments in the binary content by identifying at least one of a respective starting point or end point of different data types in the binary content, examining the determined data segments of the binary content to identify data segments that are resistant to analysis, and applying respective techniques to the identified, analysis-resistant data segments to render the content of the identified, analysis-resistant data segments.

In some embodiments, the method can further include analyzing the rendered content of the identified, analysis-resistant data segments using a second machine learning process to determine if the identified, analysis-resistant data segments contain malicious content and if the rendered content contains malicious content, training a machine learning process to recognize the rendered content as malicious content.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, processes, and systems) for the automatic segmentation of binary content and for the training of machine learning models to effectuate the automatic segmentation of binary content, and for the identification of analysis-resistance content in accordance with the present principle. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles are described herein as rendering content of analysis-resistant data segments of content to be able to analyze the content of the analysis-resistant data segments for the existence of malware, in other embodiments, content of analysis-resistant data segments of content can be rendered in accordance with the present principles for other forms of analysis, including but not limited to, reverse engineering analysis, compression algorithm design, data optimization (i.e., for data transfer/communication, storage, etc.), and the like.

For example, some anti-malware applications rely on machine learning to detect malicious code in binary content, such as known executable files with the history of being malicious. However, some binary content is resistant to analysis. Such binary content is considered analysis-resistant content herein. For example, binary content such as encrypted data, compressed data, (e.g., files (or directories) contained in zip, etc.), corrupted data (files that cannot be executed or identified), portable data format files (including image files), network packets/downloaded data, and firmware are examples of some problematic binary content that employ irregular structure or evasion techniques, which make them difficult to analyze for, for example, malware. As such, such analysis-resistant content cannot be analyzed for malware and as such cannot be used to train machine learning algorithms to recognize such content for identifying content that may contain malware.

Embodiments consistent with the present principles provide methods and systems for the automatic segmentation of binary content and for the training of machine learning models to effectuate the automatic segmentation of binary content and for the identification of analysis-resistance content. For example, in some embodiments a method of training a machine learning algorithm can include at least one of applying a supervised learning approach to a ML tool for file type identification, mixing binary data in various ways, feeding the model of binary content with labeled data content/bitstreams identifying data segments in all sorts of combinations, feeding binaries to the model, classifying blobs (chunks) of data, training a ML model on segmentation (and classification) of data, applying trained ML model to unknown binaries, testing the results, and implementing more samples for ML model training. That is, in some embodiments features of binary data content are implemented to train an ML model to recognize and classify binary content data types. Subsequently, the ML model can look for specific features/attributes in, for example, data content/bitstreams comprising different binary content types, to identify and classify the different data segments in content based on the different file types. In accordance with the present principles, once the content has been segmented and the data types have been classified, analysis-resistant data segments can be identified, and known techniques can be used to unpack/decrypt/etc., the analysis-resistant data, based on the identified classification of the data type of the analysis-resistant data to be able to analyze the data for, for example, malware. The analyzed analysis-resistant content identified to contain malware can then be used to further train the ML model to identify/recognize analysis-resistant content that can contain malware.

Figure 1:
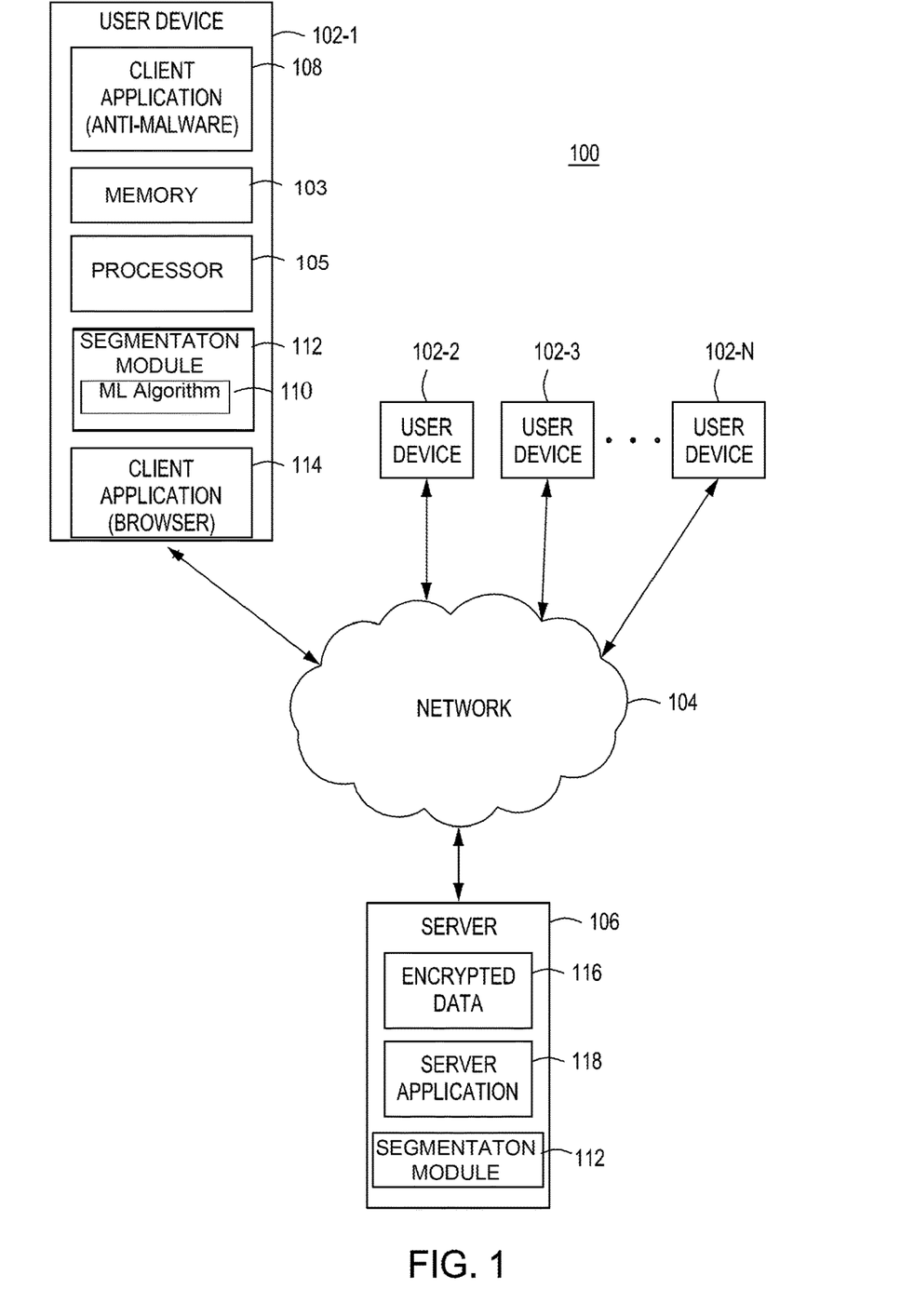
FIG. 1 depicts a high-level block diagram of a system for the automatic segmentation of binary content in accordance with an embodiment of the present principles.

FIG. 1 depicts a system 100 for the automatic segmentation of binary content in accordance with an embodiment of the present principles. The system 100 of FIG. 1 illustratively includes at least one user device 102, a server 106, and a computer network 104, (e.g., the Internet) connecting the server 106 to the user devices 102. The server 106 is a centralized computing device used to execute the application(s) (server application 118) and communicate encrypted data 116 to/from user devices 102. The general structure of such a server and/or user device is described in detail below with respect to FIG. 4.

User devices 102-1, 102-2, 102-3 . . . 102-N (collectively referred to as user devices 102) communicate through network 104 with the server 106. In some embodiments, user device 102 can be any computing device capable of hosting a client application 108 and 114 (e.g., anti-malware or anti-virus application 108 and browser 114). User device 102 can comprise any device that is connected to a network, including, for example, a laptop, a mobile phone, a tablet computer, a desktop computer, a smart device, a router, and other network devices. In the embodiment of FIG. 1, each user device 102 comprises a local memory 103 and a processor 105 illustratively including a client application software (browser) 114, at least one segmentation module 112 and a client application (anti-malware) 108. In one embodiment, the browser 114 is a well-known application for accessing and displaying web page content. Such browsers include, but are not limited to, Safari®, Chrome®, Explorer®, Firefox®, etc.

In operation, in some embodiments the browser 114 accesses content for the user device 102. At the user device 102, in some embodiments the segmentation module 112 can evaluate the received content to determine classes/types of the data in the received content using a machine learning (ML) algorithm 110. Once the classes/types of the data in the content have been identified, the segmentation module 112 can segment the content based on the identified, different classes/types of the data by, for example, identifying at least one of a respective starting point or end point of the data types in the content. The segmentation module 112 can then identify which data segments of the content are resistant to analysis. That is, in some embodiments, the segmentation module 112 can apply algorithms or other analysis techniques, such as pattern recognition techniques, to identify data segments that are resistant to analysis.

In some embodiments, the segmentation module 112 can then apply techniques to the analysis-resistant segments to render the content of the identified analysis-resistant segments to, for example, enable the content of the identified analysis-resistant segments to be analyzed for malware. In some embodiments, the segmentation module 112 can further use data content associated with analysis-resistant segments identified by the analysis to contain malware, to train an ML model, for example, associated with the anti-malware or anti-virus application 108, to recognize such data content associated with the analysis-resistant segments as containing malware. Although in the embodiment of FIG. 1, the segmentation module 112 is depicted as comprising a component/application of a user device 102, alternatively or in addition and as further depicted in FIG. 1, the segmentation module 112 can comprise a component/application of the server 106. In some embodiments, a segmentation module of the present principles, such as the segmentation module 112 of FIG. 1, can be delivered from the server 106 over the network 104 to a user device 102 as, for example, an application, and in some embodiments, as a feature of the anti-malware or anti-virus application 108.

Figure 2:
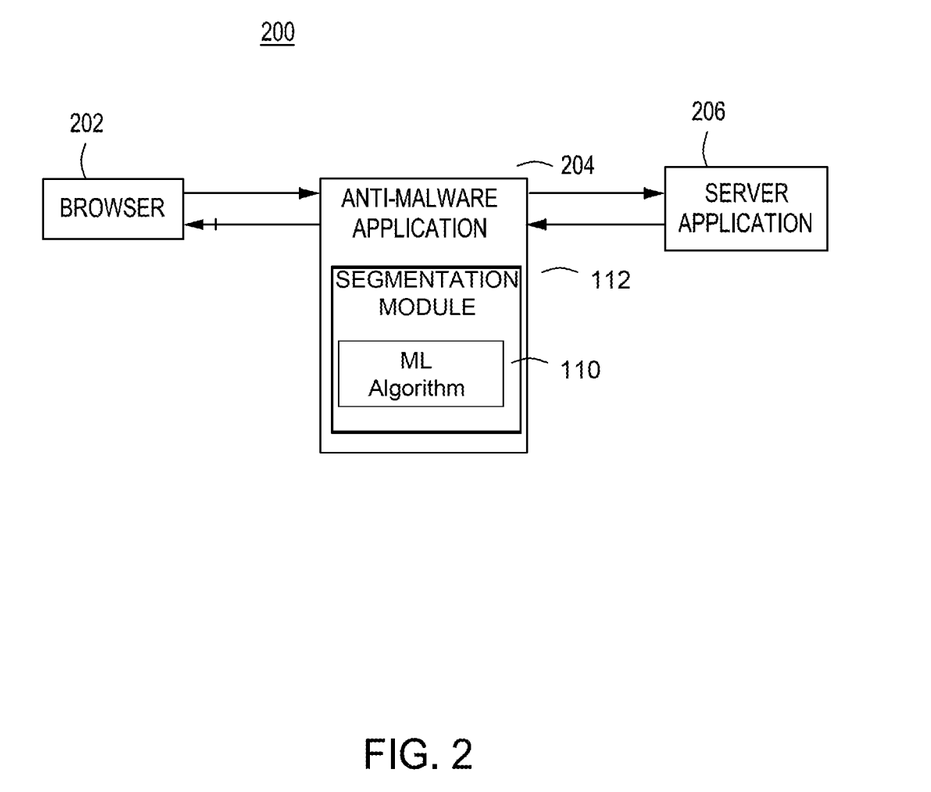
FIG. 2 depicts a block diagram of a specific use case for the segmentation module of the processor of the system of FIG. 1 in accordance with at least one embodiment of the present principles.

FIG. 2 depicts a block diagram of a more detailed specific use case 200 of a segmentation module of the present principles, such as the segmentation module 112 of the system 100 of FIG. 1 in accordance with at least one embodiment of the present principles. The use case 200 utilizes an anti-malware application 204 to monitor data traffic between a browser 202 and a server application 206 for the purposes of, for example, detecting malware in data. In the embodiment of FIG. 2, the segmentation module 112 is depicted as an application of the anti-malware application 204.

More specifically, the use case 200 of FIG. 2 comprises a browser 202 that is capable of sending and receiving data content/bitstreams from the server application 206. The browser 202 receives the data content/bitstreams served by the server application 206. In the embodiment of FIG. 2, the received data content/bitstream is to be analyzed by the anti-malware application 204 to detect malware in the data content/bitstreams. As described above, in some instances content can be resistant to malware analysis. As depicted in the embodiment of FIG. 2, the segmentation module 112 of the present principles can be applied in such instances.

More specifically, the segmentation module 112 analyzes the received data content/bitstream to determine class(es)/type(s) of the data in the data content/bitstreams to enable segmentation of the content using the ML algorithm 110 in accordance with the present principles. That is, the segmentation module 112 segments received data content/bitstreams having multiple content classes (e.g., a stream of content comprising segments of varying content types) into separate parts based on the content types of the various components of the content. For example, content can be comprised of several types of data. In some embodiments, the segmentation module 112 segments the content based on the types of data of the content as recognized by the ML algorithm 110. In some embodiments, the ML algorithm 110 can further be trained to recognize and identify the starting and end points of the different types of data to perform data segmentation.

Once the analysis-resistant content is segmented, the segmentation module 112 can identify which segment(s) of the content contain analysis-resistant data. For example, in one embodiment, the segmentation module 112 can attempt to analyze the segments by, for example, applying the anti-malware application 204 to the segments, to determine which data segments are resistant to analysis.

The segmentation module 112 can then perform necessary additional steps/techniques to prepare the analysis-resistant data segments for analysis, for example, malware analysis. For example, if the analysis-resistant data is identified by the segmentation module 112 to be encrypted data, the segmentation module 112 can identify the type of encryption and decrypt the data using an appropriate decryption technique/application. In some embodiments, the decrypted data can then be rendered for analysis. That is, in some embodiments, the decrypted data can be analyzed to determine if malware exists in the decrypted data.

In accordance with the present principles and as depicted in FIG. 2, the machine learning (ML) model/algorithm 110 of the segmentation module 112 can be trained to recognize and segment content as described above. In some embodiments, the ML algorithm 110 can be a multi-layer neural network comprising nodes that are trained to have specific weights and biases. In some embodiments, the ML algorithm 110 employs artificial intelligence techniques or machine learning techniques to analyze received analysis-resistant content. In some embodiments in accordance with the present principles, suitable machine learning techniques can be applied to learn commonalities in sequential application programs and for determining from the machine learning techniques at what level sequential application programs can be canonicalized. In some embodiments, machine learning techniques that can be applied to learn commonalities in sequential application programs can include, but are not limited to, regression methods, ensemble methods, or neural networks and deep learning such as 'Se2oSeq' Recurrent Neural Network (RNNs)/Long Short-Term Memory (LSTM) networks, Convolution Neural Networks (CNNs), graph neural networks applied to the abstract syntax trees corresponding to the sequential program application, and the like. In some embodiments a supervised ML classifier could be used such as, but not limited to, Multilayer Perceptron, Random Forest, Naive Bayes, Support Vector Machine, Logistic Regression and the like. In addition, in some embodiments, the ML algorithm of the present principles can implement at least one of a sliding window or sequence-based techniques to analyze data.

The ML algorithm 110 can be trained using a plurality (e.g., hundreds, thousands, millions) of instances of labeled content in which the training data comprises a plurality of streams of labeled segments of data to train an ML algorithm of the present principles to recognize the different data types/segments in the content. For example, in some embodiments, training data can be constructed to include a labeled bit of audio data, a labeled bit of image data, and a labeled bit of text data spliced together.

In accordance with the present principles, in some embodiments an ML algorithm of the present principles can be trained to recognize and identify the starting and end points of the different types of data to perform data segmentation. That is, in some embodiments, an ML algorithm of the present principles can be fed with sequences of feature tensors and probabilities that each point can be another segment. Particularly, in sequence-to-sequence models a sliding window technique can be used, and the output would be a probability that the point defines the beginning of another segment. In such embodiments, a set of probabilities can be determined for each class in each window when determining a content/data class for a segment.

Alternatively or in addition, as referred to above, an ML algorithm/model of the present principles can be trained to recognize data segments of content/bitstreams using bitstreams of different types of data that are labeled. This can be accomplished by randomly splicing data and marking the boundaries for training purposes or by accessing predefined data content/streams and labelling them, or even applying both processes, since the mix of data can be better for training the model. In addition, an ML algorithm/model of the present principles can help to classify unknown sections/segments of the data content/bitstreams.

In some embodiments of the present principles, an ML algorithm of the present principles, such as the ML algorithm 110, can be further trained using a plurality (e.g., hundreds, thousands, millions) of instances of labeled data types/segments having multiple different, labeled coding formats to train an ML algorithm of the present principles to recognize coding formats of the different data types/segments. For example, in some embodiments, training data can be constructed to include a labeled bit of coded audio data, a labeled bit of coded image data, and a labeled bit of coded text data spiced together; the label for each section identifying a type of coding for each segment of data. The ML algorithm of the present principles can be trained to recognize and identify the coding type of the different segments of data.

Over time, the ML algorithm learns to look for specific features/attributes in the content to identify the different data types/segments in the content. That is, upon training, an ML algorithm/model of the present principles can then identify different segments in data content/data streams by, for example, extracting features of the data content/data stream. For example, in accordance with embodiments of the present principles, before data content/bitstream can be analyzed, feature extraction (i.e., feature vectors, feature metrics) is accomplished by performing certain transformations, for example, Laplace-related transforms, vectors of entropies, n-gram transforms, etc. The algorithm/model will be trained to identify the kinds of segments and the boundaries between those segments (i.e., one segment identified as a code, another as video data, another as audio) in received content. As such and in accordance with at least some embodiments of the present principles, by identifying the segments of received data content/bitstreams, segmentation module of the present principles, such as the segmentation module 112, can choose to focus on only a segment(s) of the data content/bitstream for further processing. For example, if a maliciousness of data content/bitstream is to be analyzed, the segmentation module of the present principles can focus on a code segment(s) of received data content/bitstream for maliciousness analysis.

Once the data segments in the data content/bitstreams are identified, a segmentation module of the present principles, such as the segmentation module 112 of FIG. 2, can identify which data segments of the content are analysis-resistant and can apply respective techniques to the data segments to render the content of the analysis-resistant data segments to, for example, make the rendered segments of the analysis-resistant data segments capable of being analyzed, for example, for malware. For example, in some embodiments, a segmentation module of the present principles, such as the segmentation module 112 of FIG. 2, can apply respective conventional algorithms to the classified segments to attempt to identify segments of data content/bitstreams resistant to analysis by identifying the segments which can't be parsed and are unreadable for an algorithm, a pattern or a rule-based approach. For example, in some embodiments, portions of bites of the data content/bitstream can be examined and compared to known signatures/patterns, and if no matches are found, the data content/bitstream can be determined to be analysis resistant. Alternatively or in addition, an algorithm can be used to parse segments of data content/bitstream and if the algorithm also fails to parse the content or an unexpected value is found, the respective segments can be defined as resistant to analysis. Alternatively or in addition, a segmentation module of the present principles, such as the segmentation module 112 of FIG. 2, can attempt to apply malware analysis to the identified data content/bitstream segments, and as such, the data content/bitstream segments resistant to, for example, malware analysis can be identified as analysis resistant content.

In some embodiments, once the analysis-resistant segments are identified, an ML algorithm of the present principle, such as the ML algorithm 110, can be applied to the analysis resistant segments to attempt to recognize at least one respective coding format(s) of the analysis-resistant segments. For example and as described above, in some embodiments, training data for an ML algorithm of the present principles, such as the ML algorithm 110, can be constructed to include a labeled bit of coded audio data, a labeled bit of coded image data, and a labeled bit of coded text data spiced together; the label for each section identifying a type of coding for each segment of data. As such, the ML algorithm of the present principles can be trained to recognize and identify the coding type of the different segments of data.

In accordance with the present principles, once a coding format of an analysis-resistant segment is identified, an appropriate, known technique can be used to reverse the coding to enable the analysis-resistant segment to be analyzed, for example, for the presence of malware by, for example, applying the anti-malware application 108 in the user device 102. That is, analysis-resistant data segments can be identified and known techniques can be used to render/unpack/decrypt/etc., the analysis-resistant data, based on the identified classification of the data type of the analysis-resistant data to be able to analyze the data. For example, in some embodiments, techniques for enabling a rendering/unpacking/decrypting/etc., of analysis-resistant data can include at least one of decryption techniques and decompression techniques.

Once the data content of an analysis-resistant data segment is available for analysis, in some embodiments of the present principles, the data content of the analysis-resistant data segment can be analyzed by, for example, the anti-malware application 108 in the user device 102 for the presence of malicious content (e.g., malware). If malicious content is identified in the data content of the previously analysis-resistant data segment, the data content identified as having malicious content can be used to train an ML algorithm used to identify malicious content, such as an ML algorithm of the anti-malware application 108 in the user device 102 of FIG. 1.

Figure 3:
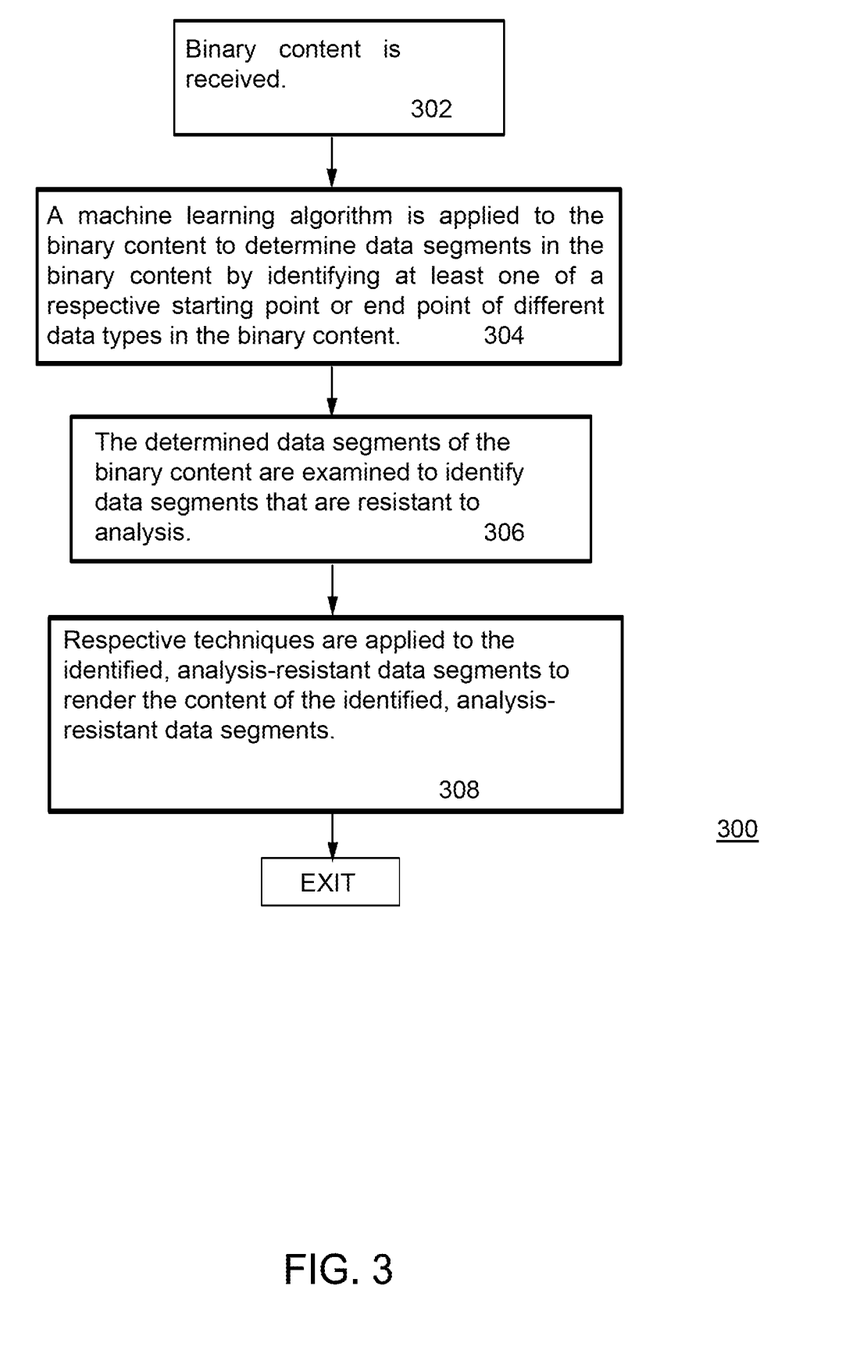
FIG. 3 depicts a flow diagram of a method for the automatic segmentation of binary content in accordance with an embodiment of the present principles.

FIG. 3 depicts a flow diagram 300 of a method for automated binary segmentation in accordance with an embodiment of the present principles. The method 300 can begin at 302 during which binary content is received. The method 300 can proceed to 304.

At 304, a machine learning algorithm is applied to the binary content to determine data segments in the binary content by identifying at least one of a respective starting point or end point of different data types in the binary content. The method 300 can proceed to 306.

At 306, the determined data segments of the binary content are examined to identify data segments that are resistant to analysis. The method 300 can proceed to 308.

At 308, respective techniques are applied to the identified, analysis-resistant data segments to render the content of the identified, analysis-resistant data segments. For example, in some embodiments, the content of analysis-resistant segments is rendered, to, for example, enable the identified segments to be analyzed for malware. The method 300 can be exited.

In some embodiments, the method can further include applying a machine learning algorithm to identify malicious content in the rendered content and, if malicious content exists, using the rendered content to train the machine learning algorithm to recognize the malicious content.

Figure 4:
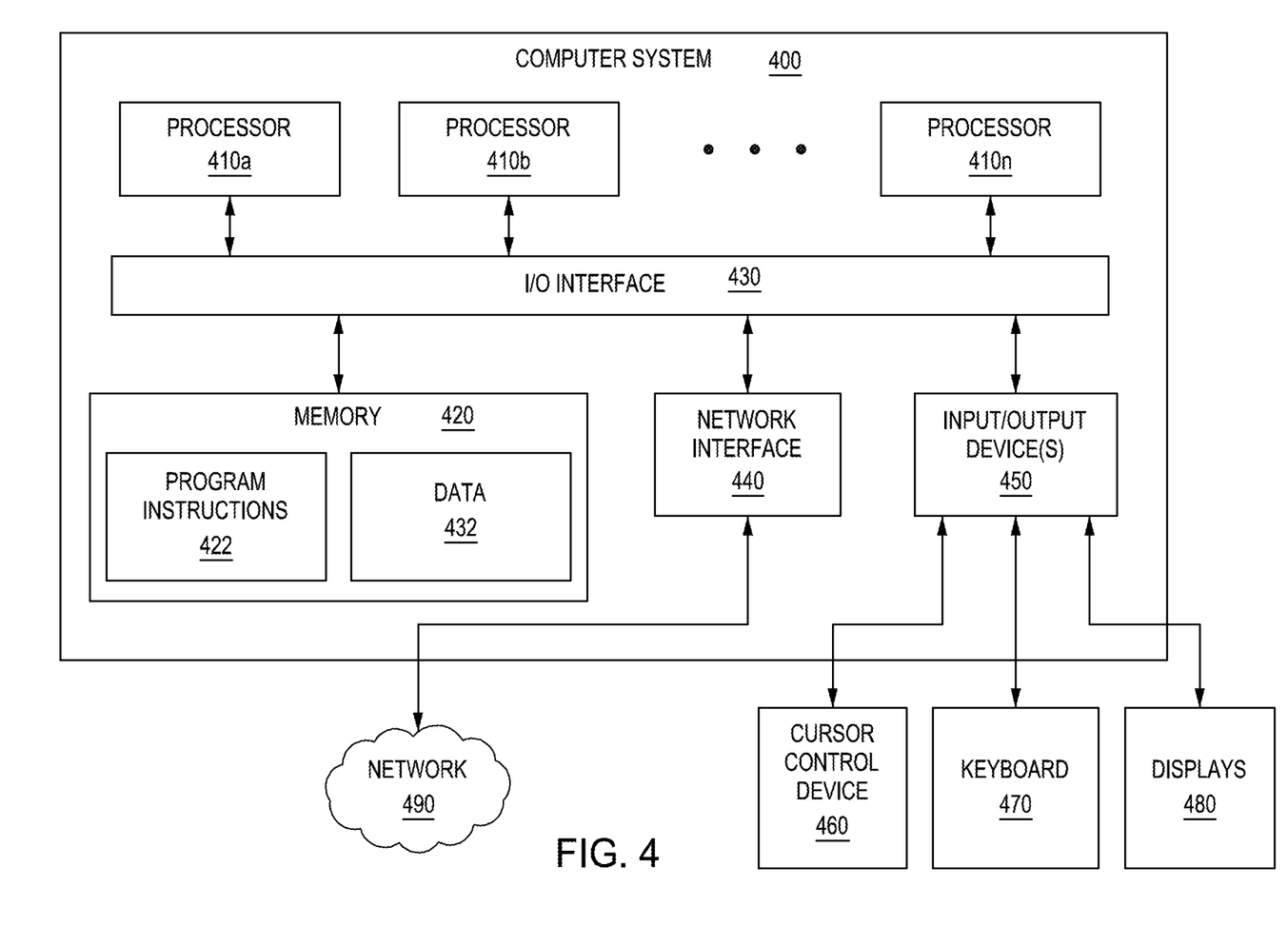
FIG. 4 depicts a high-level block diagram of a computing device suitable for use with embodiments for training a binary content segmentation model in accordance with an embodiment of the present principles.

FIG. 4 depicts a computer system 400 that can be utilized in various embodiments of the present principles to implement the computer and/or the display, according to one or more embodiments.

Various embodiments of method and system for generating a dynamic secure certificate, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement the user devices 102 and server 106 and implement the method 300 as processor-executable program instructions 422 (e.g., program instructions executable by processor(s) 410) in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of the processors 410 may commonly, but not necessarily, implement the same ISA.

System memory 420 may be configured to store program instructions 422 and/or data 432 accessible by processor 410. In various embodiments, system memory 420 may be implemented using any non-transitory computer readable media including any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the operations and methods described above, such as the methods illustrated by the flowchart of FIG. 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description on a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

Embodiments of the present principles include but are not limited to:

A method for automatic binary content segmentation, comprising: receiving binary content; applying a first machine learning process to the binary content to determine data segments in the binary content by identifying at least one of a respective starting point or end point of different data types in the binary content; examining the determined data segments of the binary content to identify data segments that are resistant to analysis; and applying respective techniques to the identified, analysis-resistant data segments to render the content of the identified, analysis-resistant data segments.

The methods above, wherein the rendering of the content of the identified, analysis-resistant data segments enables the identified, analysis-resistant data segments to be analyzed.

The methods above, further including analyzing the rendered content of the identified, analysis-resistant data segments using a second machine learning process to determine if the identified, analysis-resistant data segments contain malicious content and if the rendered content contains malicious content, training the second machine learning process to recognize the rendered content as malicious content.

The method above wherein the analysis resistant data segments comprise at least one of encrypted data content, compressed data content, corrupted data content, data content having a portable data format, firmware files, or data content employing irregular structure or evasion techniques.

The methods above wherein the respective techniques comprise at least one of a decryption technique or a decompression technique.

The methods above wherein the first machine learning process is trained using labeled content including at least two data segments having different data types.

An apparatus for automatic binary content segmentation, including a memory for storing at least one of programs or instructions; a processor programmed to execute the at least on of programs or instructions to perform a method for automatic binary file segmentation, including receiving binary content; applying a first machine learning process to the binary content to determine data segments in the binary content by identifying at least one of a respective starting point or end point of different data types in the binary content; examining the determined data segments of the binary content to identify data segments that are resistant to analysis; and applying respective techniques to the identified, analysis-resistant data segments to render the content of the identified, analysis-resistant data segments.

The apparatus above, wherein rendering the content of the identified, analysis-resistant data segments enables the identified, analysis-resistant segments to be analyzed.

The apparatus above, wherein the rendered content of the identified, analysis-resistant segments are analyzed using a second machine learning process to determine if the identified, analysis-resistant segments contain malicious content and if the rendered content contains malicious content, training the second machine learning process to recognize the rendered content as malicious content.

The apparatus above, wherein the analysis resistant content comprises at least one of encrypted files, compressed files, corrupted files, files having a portable data format, firmware files, or files employing irregular structure or evasion techniques.

The apparatus above, wherein the respective techniques comprise at least one of a decryption technique or a decompression technique.

The apparatus above, wherein the first machine learning process is trained using labeled content including at least two data segments having different data types.

A non-transitory computer readable storage medium having stored thereon a plurality of instructions that when executed by a processor performs a method for automatic binary content segmentation including: receiving binary content; applying a first machine learning process to the binary content to determine data segments in the binary content by identifying at least one of a respective starting point or end point of different data types in the binary content; examining the determined data segments of the binary content to identify data segments that are resistant to analysis; and applying respective techniques to the identified, analysis-resistant data segments to render the content of the identified, analysis-resistant data segments.

The computer readable storage medium above, wherein rendering the content of the identified, analysis-resistant data segments enables the identified, analysis-resistant segments to be analyzed.

The computer readable storage medium above, wherein the rendered content of the identified, analysis-resistant segments are analyzed using a second machine learning process to determine if the identified, analysis-resistant segments contain malicious content and if the rendered content contains malicious content, training the second machine learning process to recognize the rendered content as malicious content.

The computer readable storage medium above, wherein the analysis resistant content comprises at least one of encrypted files, compressed files, corrupted files, files having a portable data format, firmware files, or files employing irregular structure or evasion techniques.

The computer readable storage medium above, wherein the respective techniques comprise at least one of a decryption technique or a decompression technique.

The computer readable storage medium above, wherein the first machine learning algorithm is trained using labeled content including at least two data segments having different data types.

The invention claimed is:

1. A method for automatic binary content segmentation, comprising:
   receiving binary content;
   applying a first machine learning process to the binary content to determine data segments in the binary content by identifying at least one of a respective starting point or end point of different data types in the binary content;
   examining the determined data segments of the binary content to identify data segments that are resistant to analysis; and
   applying respective techniques to the identified, analysis-resistant data segments to render the content of the identified, analysis-resistant data segments.

2. The method of claim 1, wherein the rendering of the content of the identified, analysis-resistant data segments enables the identified, analysis-resistant data segments to be analyzed.

3. The method of claim 2, further comprising:
analyzing the rendered content of the identified, analysis-resistant data segments using a second machine learning process to determine if the identified, analysis-resistant data segments contain malicious content.

4. The method of claim 3, further comprising:
if the rendered content contains malicious content, training the second machine learning process to recognize the rendered content as malicious content.

5. The method of claim 1, wherein the analysis-resistant data segments comprise at least one of encrypted data content, compressed data content, corrupted data content, data content having a portable data format, firmware files, or data content employing irregular structure or evasion techniques.

6. The method of claim 1, wherein the respective techniques comprise at least one of a decryption technique or a decompression technique.

7. The method of claim 1, wherein the first machine learning process is trained using labeled content including at least two data segments having different data types.

8. An apparatus for automatic binary content segmentation, comprising:
a memory for storing at least one of programs or instructions;
a processor programmed to execute the at least one of programs or instructions to perform a method for automatic binary file segmentation, comprising:
receiving binary content;
applying a first machine learning process to the binary content to determine data segments in the binary content by identifying at least one of a respective starting point or end point of different data types in the binary content;
examining the determined data segments of the binary content to identify data segments that are resistant to analysis; and
applying respective techniques to the identified, analysis-resistant data segments to render the content of the identified, analysis-resistant data segments.

9. The apparatus of claim 8, wherein rendering the content of the identified, analysis-resistant data segments enables the identified, analysis-resistant segments to be analyzed.

10. The apparatus of claim 9, wherein the rendered content of the identified, analysis-resistant segments is analyzed using a second machine learning process to determine if the identified, analysis-resistant segments contain malicious content.

11. The apparatus of claim 10, wherein the method further comprises:
if the rendered content contains malicious content, training the second machine learning process to recognize the rendered content as malicious content.

12. The apparatus of claim 8, wherein the analysis resistant content comprises at least one of encrypted files, compressed files, corrupted files, files having a portable data format, firmware files, or files employing irregular structure or evasion techniques.

13. The apparatus of claim 8, wherein the respective techniques comprise at least one of a decryption technique or a decompression technique.

14. The apparatus of claim 8, wherein the first machine learning process is trained using labeled content including at least two data segments having different data types.

15. A non-transitory computer readable storage medium having stored thereon a plurality of instructions that when executed by a processor performs a method for automatic binary content segmentation comprising:
receiving binary content;
applying a first machine learning process to the binary content to determine data segments in the binary content by identifying at least one of a respective starting point or end point of different data types in the binary content;
examining the determined data segments of the binary content to identify data segments that are resistant to analysis; and
applying respective techniques to the identified, analysis-resistant data segments to render the content of the identified, analysis-resistant data segments.

16. The non-transitory computer readable storage medium of claim 15, wherein rendering the content of the identified, analysis-resistant data segments enables the identified, analysis-resistant segments to be analyzed.

17. The non-transitory computer readable storage medium of claim 16, wherein the rendered content of the identified, analysis-resistant segments are analyzed using a second machine learning process to determine if the identified, analysis-resistant segments contain malicious content.

18. The non-transitory computer readable storage medium of claim 17, wherein the method further comprises:
if the rendered content contains malicious content, training the second machine learning process to recognize the rendered content as malicious content.

19. The non-transitory computer readable storage medium of claim 15, wherein the analysis resistant content comprises at least one of encrypted data content, compressed files, corrupted files, files having a portable data format, firmware files, or files employing irregular structure or evasion techniques.

20. The non-transitory computer readable storage medium of claim 15, wherein the first machine learning algorithm is trained using labeled content including at least two data segments having different data types.

* * * * *